(12) United States Patent
Bart et al.

(10) Patent No.: US 11,900,774 B2
(45) Date of Patent: Feb. 13, 2024

(54) CAMERA ENHANCED WITH LIGHT DETECTING SENSOR

(71) Applicant: Alarm.com Incorporated, Tysons, VA (US)

(72) Inventors: Gary Franklin Bart, Weston, FL (US); John Varn, Tequesta, FL (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/407,333

(22) Filed: Aug. 20, 2021

(65) Prior Publication Data

US 2022/0076548 A1  Mar. 10, 2022

Related U.S. Application Data

(63) Continuation of application No. 16/594,931, filed on Oct. 7, 2019, now Pat. No. 11,100,774, which is a continuation of application No. 15/938,725, filed on Mar. 28, 2018, now Pat. No. 10,438,465.

(60) Provisional application No. 62/477,522, filed on Mar. 28, 2017.

(51) Int. Cl.
| | | |
|---|---|---|
| *G08B 13/196* | (2006.01) | |
| *H04N 7/18* | (2006.01) | |
| *G06T 7/20* | (2017.01) | |
| *G06V 20/52* | (2022.01) | |
| *G06V 40/20* | (2022.01) | |

(52) U.S. Cl.
CPC .......... *G08B 13/19602* (2013.01); *G06T 7/20* (2013.01); *G06V 20/52* (2022.01); *G06V 40/20* (2022.01); *H04N 7/18* (2013.01)

(58) Field of Classification Search
CPC .... G08B 13/19602; G06T 7/20; G06V 20/52; G06V 40/20; H04N 7/18
See application file for complete search history.

(56) References Cited

U.S. PATENT DOCUMENTS

| | | |
|---|---|---|
| 5,581,297 A | 12/1996 | Koz et al. |
| 9,013,575 B2 | 4/2015 | Scalisi |
| 10,075,679 B2 | 9/2018 | Ptucha et al. |
| 2004/0212678 A1 | 10/2004 | Cooper et al. |
| 2005/0111739 A1 | 5/2005 | Ida et al. |

(Continued)

FOREIGN PATENT DOCUMENTS

| | | |
|---|---|---|
| CA | 2717866 C | 9/2009 |
| CN | 103888548 A | 6/2014 |

*Primary Examiner* — Tracy Y. Li
(74) *Attorney, Agent, or Firm* — Fish & Richardson P.C.

(57) ABSTRACT

A method includes generating, by a camera of a monitoring system that is configured to monitor a property, first image data at a first time, analyzing the first image data, determining that the first image data includes a first object that likely corresponds to a person, generating, second image data at a second, later time, analyzing the second image data, determining that the second image includes a second object that likely corresponds to a person, comparing the first object that likely corresponds to a person to the second object that likely corresponds to a person, based on comparing the first object that likely corresponds to a person to the second object that likely corresponds to a person and based on a difference between the first time and the second, later time, determining that a person is likely moving towards the camera, and performing a monitoring system action.

20 Claims, 5 Drawing Sheets

(56) References Cited

U.S. PATENT DOCUMENTS

| | | |
|---|---|---|
| 2007/0031003 A1 | 2/2007 | Cremers |
| 2009/0224909 A1 | 9/2009 | Derrick et al. |
| 2011/0191073 A1* | 8/2011 | Kim ................. G06F 17/10 |
| | | 703/2 |
| 2013/0259380 A1 | 10/2013 | Srinivasan et al. |
| 2014/0112533 A1* | 4/2014 | Wang ............. G08B 13/19608 |
| | | 382/103 |
| 2015/0378431 A1* | 12/2015 | Donaldson .......... G06F 3/04842 |
| | | 382/103 |
| 2016/0042621 A1 | 2/2016 | Hogg et al. |
| 2016/0188980 A1* | 6/2016 | Martin ................ G11B 27/005 |
| | | 382/103 |
| 2016/0307382 A1* | 10/2016 | Herman ................ G06V 40/25 |
| 2017/0359423 A1 | 12/2017 | Nadathur et al. |
| 2017/0372164 A1 | 12/2017 | Kant |
| 2018/0046864 A1* | 2/2018 | Flint ..................... H04N 5/247 |
| 2018/0091741 A1 | 3/2018 | Ida et al. |

* cited by examiner

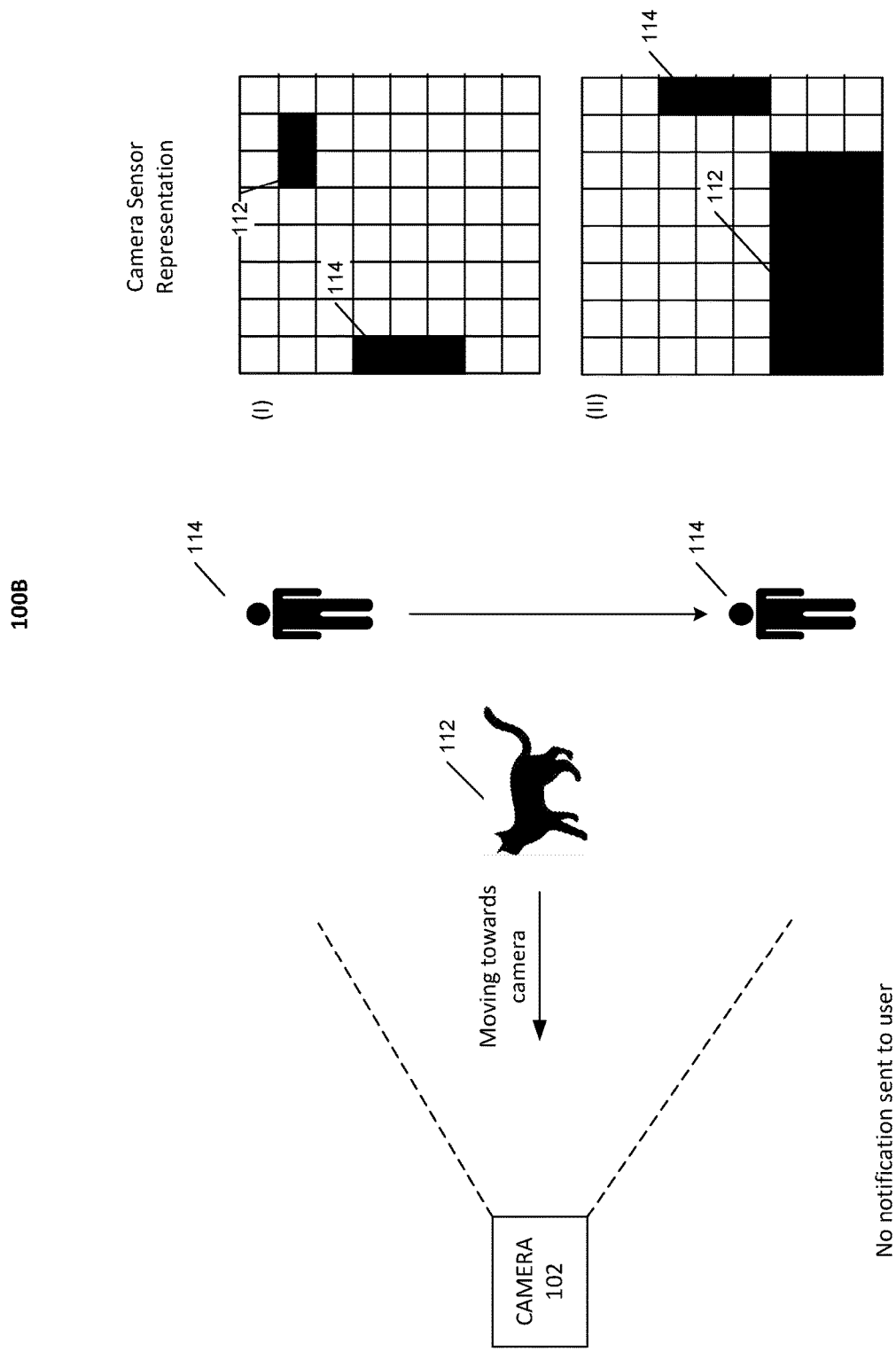

CAMERA ENHANCED WITH LIGHT DETECTING SENSOR

CROSS REFERENCE TO RELATED APPLICATIONS

This application is a continuation of U.S. application Ser. No. 16/594,931, filed Oct. 7, 2019, now allowed, which is a continuation of U.S. application Ser. No. 15/938,725, filed Mar. 28, 2018, now U.S. Pat. No. 10,438,465, issued Oct. 8, 2019, which claims the benefit of U.S. Provisional Application No. 62/477,522, filed Mar. 28, 2017, and titled "Camera Enhanced with Light Detecting Sensor." All of these prior applications are incorporated by reference in their entirety.

TECHNICAL FIELD

This disclosure relates to property monitoring technology and, for example, the use of consumer and commercial video surveillance cameras equipped with light detecting sensors in a property monitoring system.

BACKGROUND

Many people equip homes and businesses with monitoring systems to provide increased security for their homes and businesses.

SUMMARY

Techniques are described for monitoring technology. For example, techniques are described for integrating a light detecting sensor, which is low power and low resolution, with a camera to optimize the battery life of the camera within a property monitoring system.

Implementations of the described techniques may include hardware, a method or process implemented at least partially in hardware, or a computer-readable storage medium encoded with executable instructions that, when executed by a processor, perform operations.

According to an innovative aspect of the subject matter described in this application, a monitoring system that is configured to monitor a property includes a camera that is configured to generate first image data at a first time, and a monitor control unit that is configured to receive the first image data and data indicating the first time, analyze the first image data, and based on analyzing the first image data, determine that the first image data includes a first object that likely corresponds to a person, where the camera is further configured to generate second image data at a second, later time. The monitor control unit is further configured to receive the second image data and data indicating the second, later time, analyze the second image data, based on analyzing the second image data, determine that the second image data includes a second object that likely corresponds to a person, compare the first object that likely corresponds to a person to the second object that likely corresponds to a person, based on comparing the first object that likely corresponds to a person to the second object that likely corresponds to a person and based on a difference between the first time and the second, later time, determine that a person is likely moving towards the camera, and based on determining that a person is likely moving towards the camera, perform a monitoring system action.

These and other implementations each optionally include one or more of the following optional features. The monitor control unit is configured to perform the monitoring system action by providing, for output to the camera, a command to capture video data at a resolution that is higher than the first image and the second image. The monitor control unit is configured to perform the monitoring system action by providing, for output to a client device of a resident of the property, a notification indicating that a person is likely moving towards the property. The monitor control unit is configured to determine that the monitoring system is in an unarmed state and that an exterior door of the property is unlocked, and perform the monitoring system action by arming the monitoring system and locking the exterior door of the property.

The monitor control unit is configured to determine that the monitoring system is in an armed away state, and perform the monitoring system action by activating one or more lights at the property. The camera is configured to generate third image data at a third time and the monitor control unit is configured to receive the third image data and data indicating the third time, analyze the third image data, based on analyzing the third image data, determine that the third image data includes a third object that likely corresponds to an animal, the camera is configured to generate fourth image data at a fourth time. The monitor control unit is configured to receive a fourth image data and data indicating the fourth time, analyze the fourth image data, based on analyzing the fourth image data, determine that the fourth image data includes a fourth object that likely corresponds to an animal, compare the third object that likely corresponds to an animal to the fourth object that likely corresponds to an animal, based on comparing the third object that likely corresponds to an animal to the fourth object that likely corresponds to an animal and based on a difference between the third time and the fourth time, determine that an animal is likely moving towards the camera or across a field of view of the camera, based on determining that an animal is likely moving towards the camera or across the field of view of the camera, perform an action to encourage the animal to leave the property.

The camera is configured to generate third image data at a third time and the monitor control unit is configured to receive the third image data and data indicating the third time, analyze the third image data, based on analyzing the third image data, determine that the third image data includes a third object that likely corresponds to a person, the camera is configured to generate fourth image data at a fourth time. The monitor control unit is configured to receive a fourth image data and data indicating the fourth time, analyze the fourth image data, based on analyzing the fourth image data, determine that the fourth image data includes a fourth object that likely corresponds to a person, compare the third object that likely corresponds to a person to the fourth object that likely corresponds to a person, based on comparing the third object that likely corresponds to a person to the fourth object that likely corresponds to a person and based on a difference between the third time and the fourth time, determine that a person is likely moving across a field of view of the camera, based on determining that a person is likely moving across the field of view of the camera, determine not to perform a monitoring system action.

The monitor control unit is configured to determine that the third object that likely corresponds to a person is represented by a first number of pixels, determine that the fourth object that likely corresponds to a person is represented by a second number of pixels, and determine that the second number of pixels is within a pixel threshold value of the first number of pixels, determine that a person is likely moving across a field of view of the camera based further on determining that the second number of pixels is within a pixel threshold value of the first number of pixels. The monitor control unit is configured to determine that the first object that likely corresponds to a person is represented by a first number of pixels, determine that the second object that likely corresponds to a person is represented by a second number of pixels, and determine that the second number of pixels is greater than the first number of pixels, determine that a person is likely moving towards the camera based further on determining that the second number of pixels is greater than the first number of pixels. The camera includes (i) a first image sensor that collects image data at a first resolution and uses a first amount of power and (ii) a second image sensor that collects image data at a second, higher resolution and uses a second, greater amount of power.

The details of one or more implementations are set forth in the accompanying drawings and the description below. Other features will be apparent from the description and drawings, and from the claims.

DESCRIPTION OF DRAWINGS

FIGS. 1A and 1B illustrate examples of a system for determining when to send a notification to a user.

DETAILED DESCRIPTION

Figure 1A:
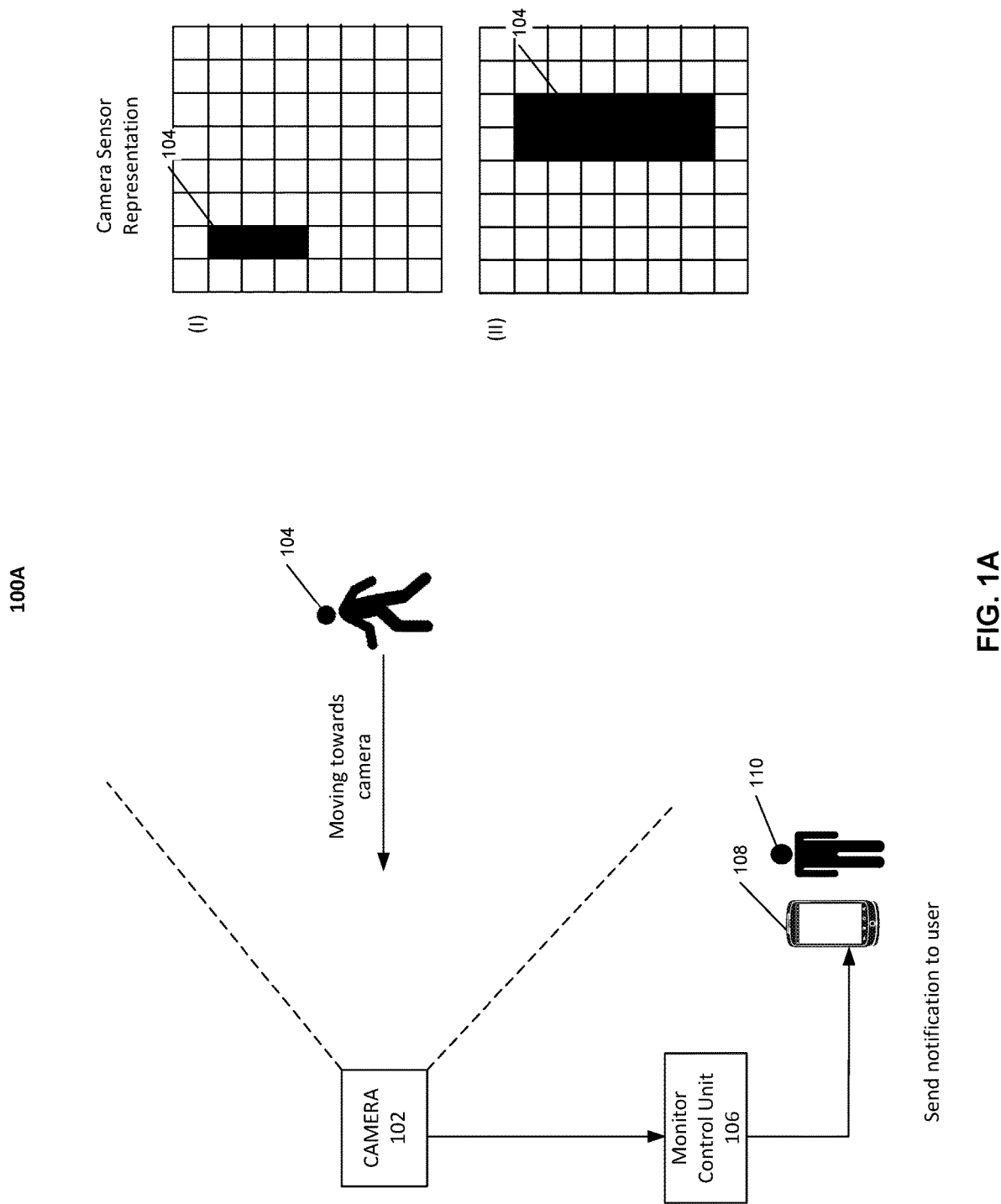

Monitoring systems that include cameras that are "mains" or "wall" powered are configured to continuously run a camera module (CMOS and lens apparatus and video CODEC), and primary system monitor control unit, as well as maintain a network connection. As such, a camera within this system is able to implement various processor-intensive and power demanding analytics, machine learning, and artificial intelligence (AI), to determine if movement seen within the field of view (FOV) of the camera meet criteria set by a user. When the movement seen within the field of view of the camera meets the user set criteria, a video clip captured by the camera and or an alert of the movement may be communicated to the user. When a camera within the monitoring system captures a video clip, the camera may upload the video to a host cloud service via either a wireless or wired connection. The wireless communication may be communicated via the Internet through a broadband connection or may be communicated via a cellular connection.

Wall powered camera systems may be limited in their utility as they must be located close to a power source. Some monitoring systems may include battery operated cameras that do not limit the location of the camera and allows the camera to be relocated. In order to be an effective and competitive product, a battery operated camera must have a reasonably long battery life, and should not be burdened by unreasonably expensive or large batteries. In some implementations, battery operated cameras do not have the power budget to operate continuously while being in continuous communication with the Internet or host cloud service without sacrificing battery life. Battery operated cameras may integrate low-power motion detection technology, such as a Passive Infrared Sensor (PIR), that may detect heat radiated from objects to detect movement of a living organism within the field of view of the sensor and camera lens. When movement is detected by the sensor, the camera may communicate with a processor within the monitoring system, the processor then communicates with a camera module to begin capturing video. The processor may also initiate a communication session to transmit the video files collected by the camera.

Techniques for integrating cameras within a monitoring system with a low cost, low-power (low resolution) type sensor are described below. The low-power, low resolution sensor is different from the PIR sensor, and is configured to operate without communicating with the monitor control unit, and thereby conserve battery power consumed during the process. Each of the cameras of the monitoring system may be integrated with a sensor that is configured to have adequate resolution and sensitivity to light. The sensor may be configured to collimate light such that an adequate number of regions of the field of view are collimated onto a sufficient number of regions on the sensor, and may be configured to assess the amount of light striking the different regions of the sensor. In visual conditions other than total darkness, objects moving within the field of view of the camera may cause changes in the amount of light reaching the light sensitive sensor, and based on the variations in the light intensity, the camera may determine when an object is moving. The sensor within the camera may determine whether the object is increasing in size, indicating the object is moving toward the camera, or may determine whether the object is decreasing in size, indicating the object is moving away from the camera. The camera may be configured to determine the shape of the detected object and may determine whether the object is a human or animal based on the determined shape.

FIG. 1 illustrates an example of system for determining when to send a notification to a user. Each of the one or more cameras 102 may be a video camera that is mounted to the external wall of a monitored property. The monitored property may be a home or commercial property, and may be monitored by a security system that includes one or more electronic sensors. The monitoring system may include a control unit 106, one or more sensors, and one or more cameras 102. The user 110 may integrate one or more cameras 102 throughout the monitored property. Each of the one or more cameras 102 on the exterior wall of the property may be equipped with a sensor that preserves battery life of the camera. The light sensors may be low cost, low-power sensors than can be operated without waking up the high resolution sensor of the camera to determine if movement within the field of view of the camera meets a user set criterion. If the movement meets a user set criteria, the primary high resolution sensor of the camera is woken up, and the camera would begin to capture video recordings of the movement. The user may then be notified based on a user set criteria being met. The number of false notifications that are sent to the user may also be decreased by incorporating the low lost light detecting sensor into the one or more cameras 102, and may only be sent when the event qualifies for the users one or more different criteria.

As illustrated in 100A of FIG. 1A, the one or more cameras 102 integrated with the light detecting sensors may detect object 104 moving within its field of view. The light detecting sensor in the camera may collimate light on to the different regions of the field of view, and may assess the amount of light striking different regions of the sensor. Based on the amount of light striking the different regions of the sensor, the sensor may identify that a moving object is within the field of view. The one or more cameras may determine the direction of movement of object 104 based on the variations in light intensity in different regions of the light detecting sensor. The light detecting sensor may determine whether the size of the object 104 is increasing within the field of view. An increase in the size of the object 104 may indicate that the object 104 is moving toward the camera. As illustrated in the camera sensor representation, at a first moment in time (I), the object 104 is smaller than at the second moment in time (II), that is, the object 104 is increasing in size within the field of view of the camera 102. The light detecting sensor in the one or more cameras 102 may also be configured to determine the shape of the object, and may distinguish between a human form and an animal form. Based on the configuration of the light striking the light sensor and in the example in FIG. 1, the camera 102 determines the human form of the object 104.

The user 110 may set one or more criteria for receiving notifications of events at the monitored property. The user may wish to receive notifications only when the one or more cameras 102 detect human forms walking towards the monitored property. The user 110 may not be interested in receiving a notification when the one or more cameras 12 detect human forms walking along the side walk or walking across the street from the property. When the one or more cameras 102 detect the object 102 is a human form and is walking towards the monitored property, the camera's 102 high resolution sensor is woken up, and the high resolution sensor begins capturing video recording of the movement. The one or more cameras communicate the detected movement to the monitor control unit 106 of the property monitoring system. The monitor control unit 106 may then send a notification of the detected movement to the user device 108 of the user 110. The notification may include the video recordings captured by the one or more cameras 102.

As illustrated in 100B of FIG. 1B, the one or more cameras 102 integrated with the light detecting sensors may detect movement within its field of view by object 112. The one or more cameras 102 may determine the direction of movement of object 112 based on the variations in light intensity in different regions of the light detecting sensor. The light detecting sensor may determine whether the size of the object 112 is increasing or decreasing within the field of view. A decrease in the size of an object would indicate an object is moving away from the camera, or is translating across the sensor. As illustrated in the camera sensor representation, at a first moment in time (I), the object 112 is smaller than at the second moment in time (II), that is, the object 112 is increasing in size within the field of view of the camera 102. The light detecting sensor in the one or more cameras 102 may also be configured to determine the shape of the object, and may distinguish between a human form and an animal form. Based on the configuration of the light striking the light sensor, the camera 102 determines the animal form of the object 112.

When the one or more cameras 102 detect the object 112 is an animal form and is walking toward from the monitored property, the high resolution sensor does not have to be woken up. The battery life of the one or more cameras 102 are preserved by only using power to wake up the high resolution sensor of the camera when the detected movement meets a user set criteria. The light detecting sensor may also determine that an object 114 is walking by the monitored property. As illustrated in the camera sensor representation, the object 114 may traverse the screen of the camera indicating the object is walking by the house. The camera may also determine the object 114 is a human form. When the cameras detect the human form 114 is walking by the house, the user criteria are not met, and the high power senor does not have to be woken up. The camera may also reserve power by not having to communicate with the control unit to send a notification to the user 110.

Figure 2:
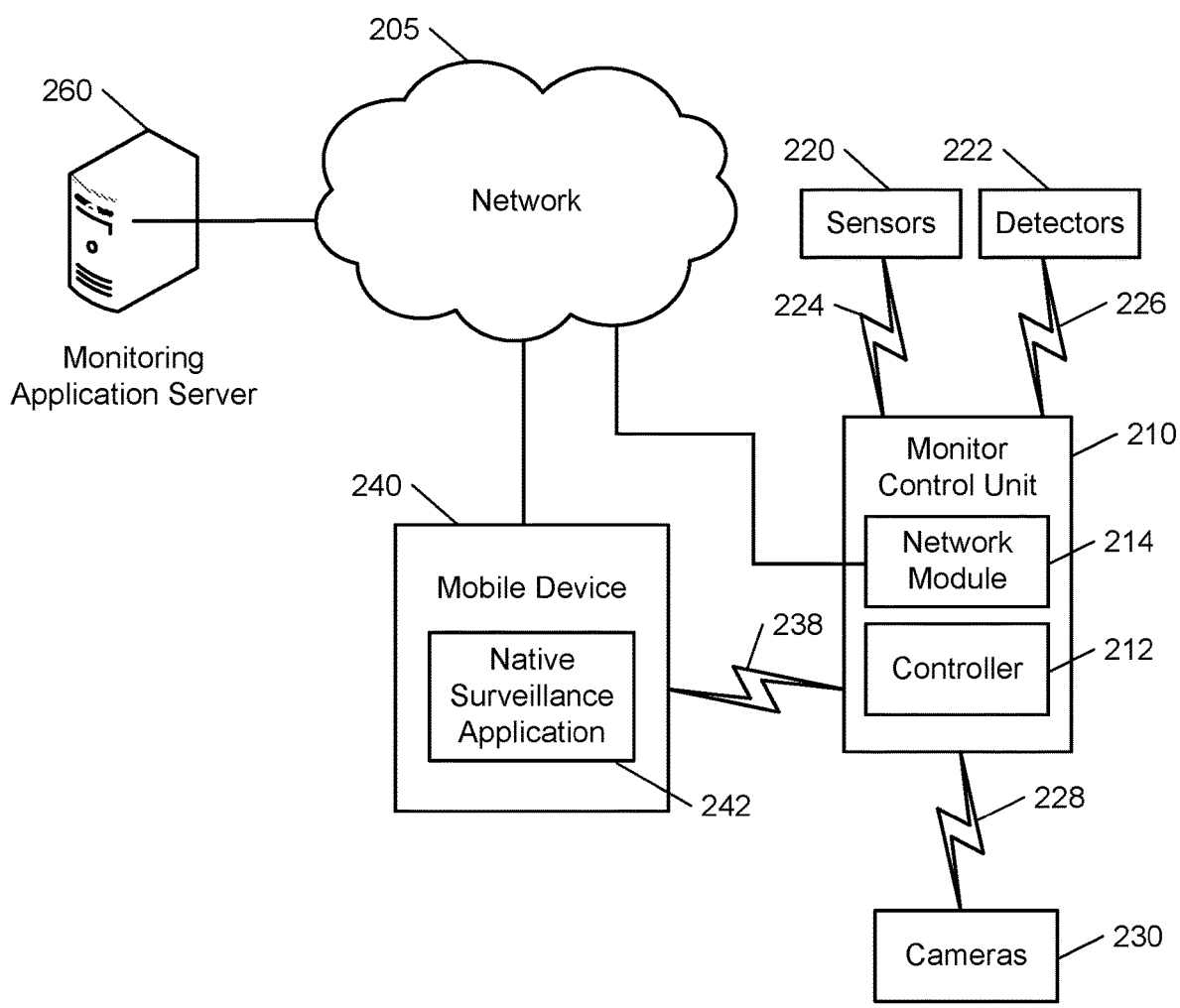
FIG. 2 illustrates an example of a monitoring system integrated with cameras.

FIG. 2 illustrates an example of a system 200 configured to monitor a property. The system 200 includes a network 205, a monitoring system control unit 210, one or more user devices 240, and a monitoring application server 260. The network 205 facilitates communications between the monitoring system control unit 210, the one or more user devices 240, and the monitoring application server 260. The network 205 is configured to enable exchange of electronic communications between devices connected to the network 205. For example, the network 205 may be configured to enable exchange of electronic communications between the monitoring system control unit 210, the one or more user devices 240, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from cameras, sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The one or more cameras 230 may be a video/photographic camera or other type of optical sensing device configured to capture images. For instance, the one or more cameras 230 may be configured to capture images of an area within a building monitored by the monitor control unit 210. The one or more cameras 230 may be configured to capture single, static images of the area and also video images of the area in which multiple images of the area are captured at a relatively high frequency (e.g., thirty images per second). The one or more cameras 230 may be controlled based on commands received from the monitor control unit 210.

The one or more cameras 230 may be triggered by several different types of techniques. For example, the one or more cameras 230 may be integrated with various light detecting sensors, such as ambient light sensors or low-resolution CMOS sensors. Each of the one or more cameras 230 may be configured to determine when an object is moving within the field of view of the camera, and may determine whether the object is increasing in size, indicating the object is moving toward the camera, or may determine whether the object is decreasing in size, indicating the object is moving away from the camera. Each of the one or more cameras 230 may be configured to determine the shape of the detected object and may determine whether the object is a human or animal based on the determined shape.

The sensors 220, the detectors 222, and the cameras 230 communicate with the controller 212 over communication links 224, 226, and 228. The communication links 224, 226, and 228 may be a wired or wireless data pathway configured to transmit signals from the sensors 220, the package holder devices 222, and the cameras 230 to the controller 212. The communication link 224, 226, and 228 228 may include a local network, such as, 802.11 "Wi-Fi" wireless Ethernet (e.g., using low-power Wi-Fi chipsets), Z-Wave, Power Over Ethernet (POE), Zigbee, Bluetooth, "HomePlug" or other Powerline networks that operate over AC wiring, and a Category 5 (CAT5) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media. The native surveillance application 242 runs on mobile devices platforms, such as iPhone, iPod touch, Blackberry, Google Android, Windows Mobile, etc. The native surveillance application 242 enables the user device 140 to receive and process image and sensor data from the monitoring system.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as Wi-Fi, Bolt, Lora, Bluetooth, Z-Wave, Zigbee, "HomePlug," or other Powerline networks that operate over AC wiring, or Power over Ethernet (POE), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitoring system control unit 210 and perform the functions of the monitoring system control unit 210 for local monitoring and long range/offsite communication.

Figure 3:
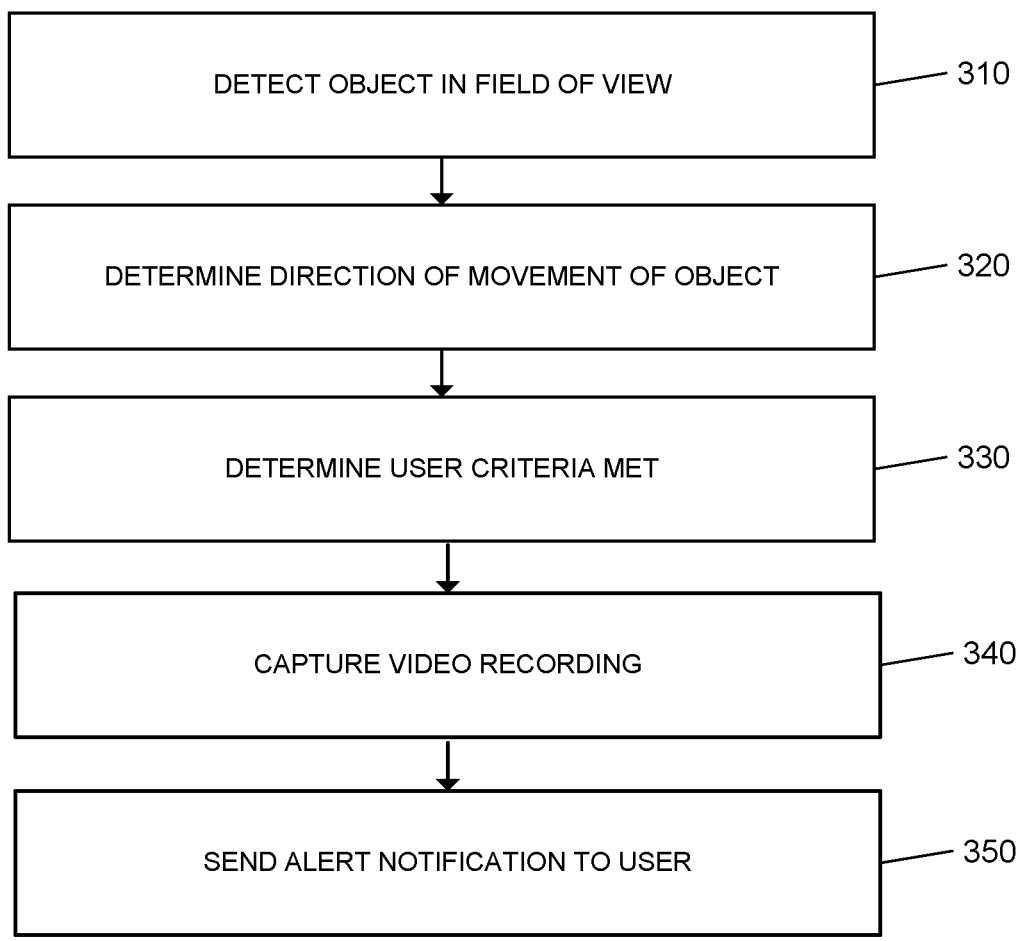
FIG. 3 is a flow chart of an example process for sending an alert notification to a user.

FIG. 3 illustrates an example process 300 for sending an alert notification to a user. The light detecting sensor within the camera detects an object in the field of view (310). The light detecting sensor may be an ambient light sensor with internal processing capability, or may be a low resolution CMOS sensor with internal processing capability. The sensor may be configured to use very little power and may be a low cost sensor. The sensor may collimate light on to different regions of the sensor and may be configured to assess the amount of light striking the various regions of the sensor. The sensor determines that an object is within the field of view when the sensor detects changes in the amount of light reaching the light sensitive sensor. In some implementations, an algorithm may be used by the sensor to calculate the changes in light resolution within the field of view of the camera.

The sensor determines the direction of movement of the object (320). The light detecting sensor may determine the direction of movement of the object within the field of view based on the variations in the light intensity in different regions of the sensor. When an object is within the field of view, the presence of different areas of contrast and temporal changes result in variations in the light intensity reaching the different regions of the sensor. The sensor may determine when the object is moving, and may determine whether the size of the object is increasing within the field of view indicating that the object is moving toward the camera. The sensor may determine when the object is moving, and may determine whether the size of the object is decreasing within the field of view indicating that the object is moving away from the camera or is translating across the sensor. The sensor may also be configured to determine the shape of the object, and may distinguish between a human form and an animal form.

The sensor may determine whether a user set criteria is met (330). The light detecting sensor integrated into the camera may be a low resolution CMOS sensor with internal processing capability (Low Power Visual Sensor System), and may not require separate processor support to determine whether a triggering event has occurred. A user may set one or more criteria for a triggering event. For example, the user may only be interested in recording video of a human walking toward the monitored property. The user may not want to receive video of people walking by the monitored property or walking away from the property. The user may also not be interested in video recording of an animal, such as a dog or a cat walking toward the property. Based on the user set criteria, the determination of the shape of the object, and the direction of movement of the object, the sensor may determine if the user criteria is met by employing an algorithm.

The camera captures video recording of the object when the sensor determines the user criteria is met (340). When the sensor determines that the user criteria is met, the camera may be activated to begin capturing high resolution video recordings of the object within the field of view. The monitoring control unit sends an alert notification to the user (350). The camera may be in communication with the monitoring control unit, and may communicate the captured video recording to the monitoring control unit. The monitoring control unit may communicate an alert notification that includes the captured video recording to the user's mobile device.

While video surveillance camera systems typically have ambient light sensors to allow the system to change exposure and enter night or day mode as ambient light conditions change, these sensors lack the resolution and/or processing capability to function in the manner described. The Low Power Visual Sensor System requires ambient light of a sufficient brightness to function properly and therefore may provide little value in low ambient light conditions. During such low ambient light conditions, the camera may rely on the PIR sensor capabilities. Given the low-power and low-cost of the Low Power Visual Sensor System however, and considering that more movement in the FOV of the camera system is generally likely to occur during the day, the Low Power Visual Sensor System could be employed during conditions with adequate ambient light and given their enhanced capabilities compared to the PIR sensor, they may provide a reduction in the number of false positives. This reduces the number of times the less power efficient components in the system must wake, thereby extending battery life. The combination of the Low Power Visual Sensor System technology, with the PIR sensor and camera system, creates an enhanced system for battery operated cameras for the purpose of optimizing battery life.

Figure 4:
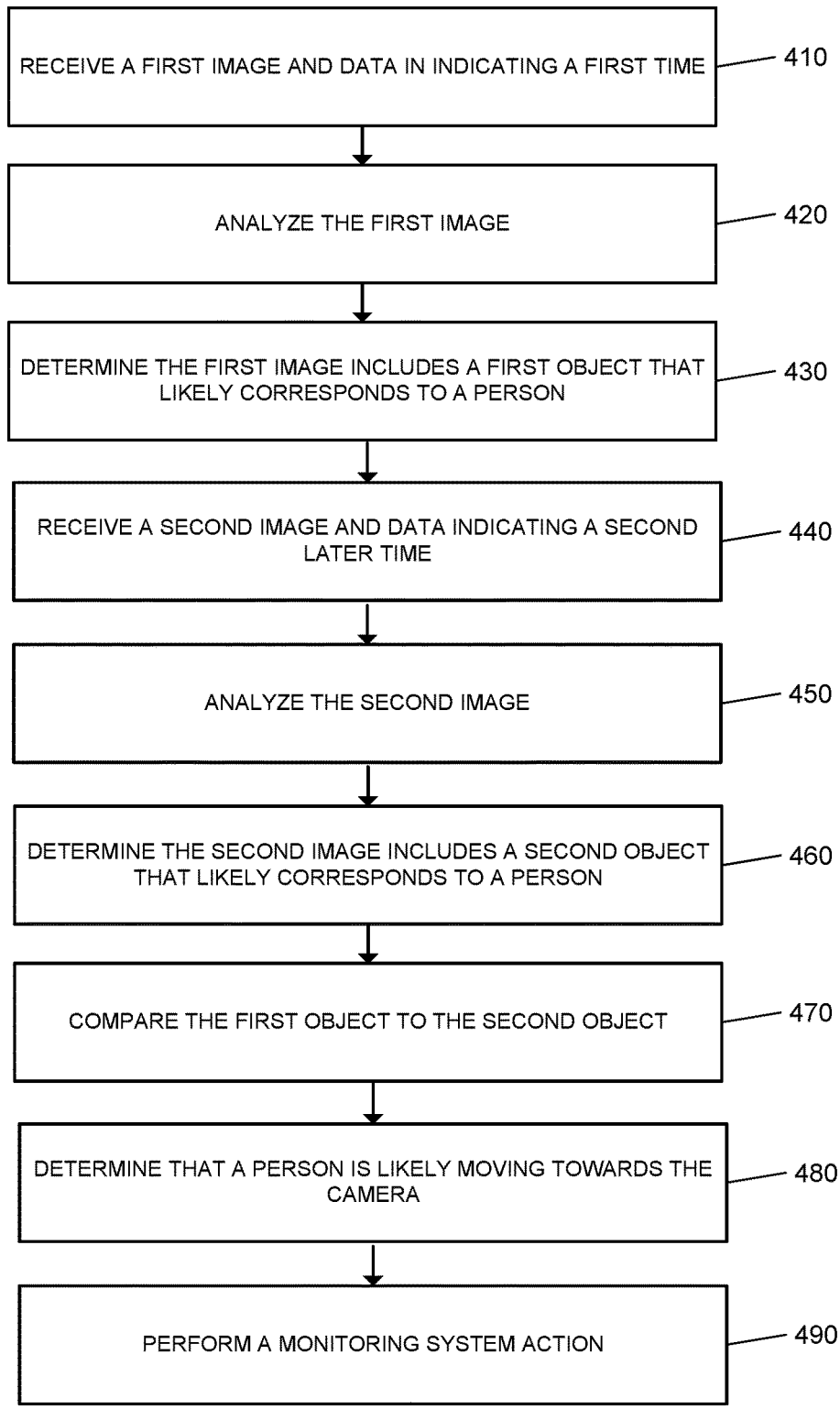
FIG. 4 is flow chart of an example process for detecting a person moving towards a camera.

FIG. 4 illustrates an example process 400 for performing a monitoring system action. The monitor control unit 106 receives, from a camera at the property, a first image generated at a first time and data indicating the first time (410). The camera may be a battery powered camera that is mounted to an exterior wall of the property, and may include a low-power light sensor that helps to preserve the battery life of the camera. The low power light sensor may be low cost sensor that is operated without initiating the high resolution sensor of the camera until movement detected by the camera meets a user set criterion.

The light sensor within the camera collimates light on to the different regions of the field of view of the camera, and assess the amount of light striking the different regions of the sensor. The light sensor of the camera may determine that a moving object is within the field of view of the camera based on the amount of light striking the different regions of the sensor. When the camera detects a moving object is within the field of view, the camera generates a first image at a first time. In some implementations, the camera may generate a plurality of images at the first time. The camera communicates the first image and the associated image data to the monitor control unit 106. The image data may include the timestamp associated with the captured image, the size of the image, and any other appropriate image data.

The monitor control unit 106 analyzes the first image (420) and determines that the first image includes a first object that likely corresponds to a person based on analyzing the first image (430). The monitor control unit 106 may identify features within the image of the object that are used to determine whether the object is of a human form or is of an animal form. For example, the monitor control unit 106 may identify an elongated object with regions that are likely limbs as a human. The monitor control unit may identify any object that includes a number of pixels higher than a threshold number of pixels as an adult. The monitor control unit 106 may identify any object that is taller than a threshold height as an adult. For examples, the monitor control unit 106 may identify any object that is estimated as over three feet tall as an adult. In some implementations, the monitor control unit may use any other suitable method to determine an object is likely an adult.

The monitor control unit 106 receives, from a camera at the property, a second image generated at a second time and data indicating the second later time (440). The camera generates a second image at a second time, in some examples, the camera generates one or more additional images of the object detected within the field of the camera at different times. For example, the camera may generate an image of the object within the field of view of the camera every 30 seconds or every 45 seconds. In some examples, the camera generates an image every second and compares each of the images to the previously generated image. The one or more additional images are communicated to the monitor control unit 106 along with the associated image data. The monitor control unit analyzes the second image (450), and determines that the second image includes a second object that likely corresponds to a person (460). The monitor control unit 106 identifies features within the second image that are associated with a human form, and determines that the second image includes an object that is of a human form.

The monitor control unit compares the first object that likely corresponds to a person to the second object that likely corresponds to a person (470), based on comparing the first object that likely corresponds to a person to the second object that likely corresponds to a person, and based on a difference between the first time and the second later time, determining that a person is likely moving towards the camera (480). The monitor control unit 106 may compare the shape of the object in the first image to the shape of the object in the second image. The monitor control unit confirms the object in the first image is the same object in the second image based on determining the shape of the object in the first image is the same as the shape of the object in the second image. The monitor control unit 106 may compare the size of the object in the first image to the size of the object in the second image. For example, the monitor control unit may compare the number of pixels of the image occupied by the object in the first image to the number of pixels of the image occupied by the object in the second image. The monitor control unit 106 confirms the object is likely moving towards the camera based on the size of the object in the second image being larger than the size of the object in the first image. The monitor control unit 106 also confirms that the second image is captured at a time later than the first image.

The monitor control unit performs a monitoring system action based on determining that a person is likely moving towards the camera (490). The monitor control unit performs a monitoring system action when a user set criterion is meet. The user may set their user criterion through the monitoring system application on their user device. The user may set the one or more criterion required to prompt the monitoring system at the property to initiate the capture of high-resolution video data. The camera is configured to conserve the amount of power used, and only initiates the capture of high resolution video data, a power heavy function, when a user criteria for detecting motion is meet.

The user may wish to receive a notification from the system when a person is determined to be walking towards the property. The camera does not capture high resolution when a person is walking by the monitored property or when an animal is walking towards the property. This feature allows the camera to reserve its battery power. In some implementations, when the monitor control unit determines that a person is likely moving towards the camera, the monitor control unit communicates an alert to the resident of the property. The monitor control unit may communicate a notification to the user device of the resident indicating that a person is approaching the property. In some examples, the notification may include a stream of the video data that is captured by the camera at the property.

In some implementations, when the monitoring system at the property is unarmed, and the system determines that a person is moving towards the camera, the monitor control unit automatically locks the door locks of the one or more exterior doors of the property, and arms the monitoring system. In some implementations, when the monitoring system at the property is armed away and the system determines that a person is moving towards the camera, the monitor control unit may switch on one or more lights at the property. In some examples, the monitor control unit may turn on a speaker located within the property, or switch on one or more sprinklers to simulate that someone is at the residence.

In some implementations, a user may set their user preference to receive notifications from the system when an animal is determined as walking towards the camera. For example, the resident may own a cat that he allows to roam outside of the property and return through an animal door at the property. In these examples, the camera may be positioned above the animal door. When the control unit determines the animal is walking towards the property, as the cat returns, the control unit initiates the capture of video data and sends a notification to the resident that includes the video stream of the animal returning home safely. In some implementations, when the system determines an animal is walking towards the property, the monitor control unit automatically opens the animal door. In some examples, where the resident does not own a pet and does not want animals on the lawn of the property, when the system determines an animal is walking towards the property, the monitor control unit automatically turns on one or more sprinklers.

In some implementations, the monitor control unit does not prompt a monitoring system action when the control unit determines that a person is walking by the property. In these implementations, the size of the object in the first image and the size of the object in the second image is the same as the object is traversing the field of view of the camera. In some implementations, the control unit does not prompt a monitoring system action when the control unit determines that an animal is walking by the property.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A monitoring system comprising:
a monitor control unit that is configured to:
process first image data from a camera that uses a first power level to generate image data in response to detecting movement at a property;
in response to processing the first image data, determined: i) a direction of movement of an object depicted in the first image data, the direction of movement of the object being determined relative to the property, and ii) that a physical attribute of the object satisfies a criteria of the monitoring system;
process second image data that the camera generates using a second power level that is higher than the first power level; and
adjust an arming status of the monitoring system and a locking status of a door at the property using: i) the second image data, ii) the physical attribute of the object, and iii) the direction of movement of the object relative to the property.

2. The monitoring system of claim 1, wherein the object is a person and the monitor control unit is configured to generate a notification indicating that the person is likely moving towards the property.

3. The monitoring system of claim 1, wherein determining that the physical attribute of the object satisfies the criteria of the monitoring system comprises:
determining, using the camera, a human form of the object or an animal form of the object.

4. The monitoring system of claim 3, wherein:
determining that the physical attribute of the object satisfies the criteria of the monitoring system comprises determining a shape of the object using variations in light intensity in different regions of a light detecting sensor of the camera; and
the monitor control unit is configured to adjust the arming status of the monitoring system and the locking status of the door at the property using the shape of the object.

5. The monitoring system of claim 4, wherein the variations in light intensity correspond to the presence of different areas of contrast and temporal changes that cause the light intensity to reach distinct regions of the light detecting sensor.

6. The monitoring system of claim 1, wherein adjusting the arming status of the monitoring system and the locking status of the door at the property comprises:
adjusting the arming status of the monitoring system and the locking status of the door at the property in response to determining that the physical attribute of the object satisfies the criteria of the monitoring system.

7. A method comprising:
processing first image data from a camera that uses a first power level to generate image data in response to detecting movement at a property;
in response to processing the first image data, determining: i) direction of movement of an object depicted in the first image data, the direction of movement of the object being determined relative to the property, and ii) that a physical attribute of the object satisfies a criteria of a monitoring system at the property;
processing second image data that the camera generates using a second power level that is higher than the first power level; and
adjusting an arming status of the monitoring system at the property and a locking status of a door at the property using: i) the second image data, ii) the physical attribute of the object, and iii) the direction of movement of the object relative to the property.

8. The method of claim 7, wherein:
the object is a person, the method comprising:
generating a notification indicating that the person is likely moving towards the property.

9. The method of claim 7, wherein determining that the physical attribute of the object satisfies the criteria of the monitoring system comprises:
determining, using the camera, a human form of the object or an animal form of the object.

10. The method of claim 9, wherein:
determining that the physical attribute of the object satisfies the criteria of the monitoring system comprises determining a shape of the object using variations in light intensity in different regions of a light detecting sensor of the camera; and
the method includes adjusting the arming status of the monitoring system and the locking status of the door at the property using the shape of the object.

11. The method of claim 10, wherein the variations in light intensity correspond to the presence of different areas of contrast and temporal changes that cause the light intensity to reach distinct regions of the light detecting sensor.

12. The method of claim 7, wherein adjusting the arming status of the monitoring system and the locking status of the door at the property comprises:
adjusting the arming status of the monitoring system and the locking status of the door at the property in response to determining that the physical attribute of the object satisfies the criteria of the monitoring system.

13. A non-transitory computer storage medium encoded with instructions that, when executed by one or more computers, cause the one or more computers to perform operations comprising:
processing first image data from a camera that uses a first power level to generate image data in response to detecting movement at a property;

in response to processing the first image data, determining: i) a direction of movement of an object depicted in the first image data, the direction of movement of the object being determined relative to the property, and ii) that a physical attribute of the object satisfies a criteria of a monitoring system at the property;

processing second image data that the camera generates using a second power level that is higher than the first power level; and adjusting an arming status of the monitoring system at the property and a locking status of a door at the property using: i) the second image data, ii) the physical attribute of the object, and iii) the direction of movement of the object relative to the property.

14. The computer storage medium of claim 13, wherein: the object is a person; and the operations comprise generating a notification indicating that the person is likely moving towards the property.

15. The computer storage medium of claim 13, wherein determining that the physical attribute of the object satisfies the criteria of the monitoring system comprises:

determining, using the camera, a human form of the object or an animal form of the object.

16. The computer storage medium of claim 15, wherein:

determining that the physical attribute of the object satisfies the criteria of the monitoring system comprises determining a shape of the object using variations in light intensity in different regions of a light detecting sensor of the camera; and the operations comprise adjusting the arming status of the monitoring system and the locking status of the door at the property using the shape of the object.

17. The computer storage medium of claim 16, wherein the variations in light intensity correspond to the presence of different areas of contrast and temporal changes that cause the light intensity to reach distinct regions of the light detecting sensor.

18. The computer storage medium of claim 13, wherein adjusting the arming status of the monitoring system and the locking status of the door at the property comprises:

adjusting the arming status of the monitoring system and the locking status of the door at the property in response to determining that the physical attribute of the object satisfies the criteria of the monitoring system.

19. The monitoring system of claim 1, wherein determining, using the image data, the direction of movement of the object relative to the property comprises:

determining a direction of the object walking across a portion of the property.

20. The monitoring system of claim 1, wherein determining that the physical attribute of the object satisfies the criteria of the monitoring system comprises:

determining the physical attribute of the object increased within a field of view of the camera along the direction of movement.

* * * * *

UNITED STATES PATENT AND TRADEMARK OFFICE
CERTIFICATE OF CORRECTION

| | |
|---|---|
| PATENT NO. | : 11,900,774 B2 |
| APPLICATION NO. | : 17/407333 |
| DATED | : February 13, 2024 |
| INVENTOR(S) | : Gary Franklin Bart and John Varn |

It is certified that error appears in the above-identified patent and that said Letters Patent is hereby corrected as shown below:

In the Claims

In Claim 1, Column 13, Lines 36-37, delete "determined:" and insert -- determine: --.

In Claim 7, Column 14, Line 19, after "i)" insert -- a --.

Signed and Sealed this
Twenty-sixth Day of March, 2024

*Katherine Kelly Vidal*

Katherine Kelly Vidal
*Director of the United States Patent and Trademark Office*